(12) United States Patent
Chheda et al.

(10) Patent No.: US 7,707,443 B2
(45) Date of Patent: Apr. 27, 2010

(54) RACK-LEVEL POWER MANAGEMENT OF COMPUTER SYSTEMS

(75) Inventors: Sachin Navin Chheda, Roseville, CA (US); Loren M. Koehler, Fair Oaks, CA (US); Robert William Dobbs, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 432 days.

(21) Appl. No.: 10/623,417

(22) Filed: Jul. 18, 2003

(65) Prior Publication Data

US 2005/0015632 A1    Jan. 20, 2005

(51) Int. Cl.
*G06F 1/32* (2006.01)

(52) U.S. Cl. ............... 713/322; 713/320; 713/321; 361/679.46

(58) Field of Classification Search ......... 713/300–340; 361/679.46
See application file for complete search history.

(56) References Cited

U.S. PATENT DOCUMENTS

| | | | |
|---|---|---|---|
| 5,650,936 A * | 7/1997 | Loucks et al. ............ | 702/62 |
| 5,652,893 A | 7/1997 | Ben-Meir et al. | |
| 5,752,047 A | 5/1998 | Darty et al. | |
| 6,418,557 B1 | 7/2002 | Otani | |
| 6,434,236 B1 | 8/2002 | Zorzella | |
| 6,445,580 B1 * | 9/2002 | Cohen et al. ............ | 361/687 |
| 6,560,114 B2 | 5/2003 | Berry et al. | |
| 6,718,474 B1 * | 4/2004 | Somers et al. ........... | 713/322 |
| 6,836,849 B2 * | 12/2004 | Brock et al. ............ | 713/310 |
| 6,859,882 B2 * | 2/2005 | Fung ...................... | 713/300 |
| 7,159,022 B2 * | 1/2007 | Primm et al. ........... | 709/224 |
| 2002/0004912 A1 * | 1/2002 | Fung ...................... | 713/300 |
| 2002/0004913 A1 | 1/2002 | Fung | |

FOREIGN PATENT DOCUMENTS

| | | |
|---|---|---|
| EP | 0 936 532 | 8/1999 |
| JP | 2002-142385 | 5/2002 |
| WO | WO 03/014892 A2 | 2/2003 |

* cited by examiner

*Primary Examiner*—Thuan N Du

(57) ABSTRACT

One embodiment disclosed relates to a system for power management of a group of computers. The system includes server side infrastructure (SSI) circuitry at each computer in the group and a centralized power management module (CPMM). The SSI circuitry includes local monitoring circuitry coupled to a central processing unit (CPU) of the computer. The CPMM has a management link to the SSI circuitry at each computer in the group. The local circuitry at each computer monitors power consumption at the CPU of that computer and transmits power consumption data to the CPMM. The CPMM applies a set of rules to the power consumption data to determine when and at which computers to enable and disable a CPU power throttling mode.

17 Claims, 2 Drawing Sheets

RACK-LEVEL POWER MANAGEMENT OF COMPUTER SYSTEMS

BACKGROUND OF THE INVENTION

1. Field of the Invention

The present invention relates generally to power supplies for electronics and computers.

2. Description of the Background Art

Computer networks, such as the Internet, utilize high performance computer systems called "servers." Servers typically have high performance processors and contain hardware and software capable of handling large amounts of data. Servers provide a large number of computer users with compute services and access to large stores of information. For example, servers are used to host web sites that can be accessed by many computers via the Internet.

Multiple server components are often housed within a server housing or "server rack". Server racks are typically box-like structures or cabinets that contain a number of removable electronic modules or electronic trays. Each electronic tray can be a different server, or each electronic tray can hold one or more components of a server.

Other types of computing systems include bladed computers, workstations, and other computing machines. These computing systems may be in various arrangements, and are not necessarily in a racked configuration.

The above discussed server racks, blade chassis, workstation groups, and similar systems require substantial power to operate, and continuous operation of the computing systems is of critical importance in data centers, office environments, and other applications. Hence, improvements in systems and methods for providing power to systems with multiple computers are highly desirable.

SUMMARY

One embodiment of the invention pertains to a system for power management of a group of computers. The system includes server side infrastructure (SSI) circuitry at each computer in the group and a centralized power management module (CPMM). The SSI circuitry includes local monitoring circuitry coupled to a central processing unit (CPU) of the computer. The CPMM has a management link to the SSI circuitry at each computer in the group. The local circuitry at each computer monitors power consumption at the CPU of that computer and transmits power consumption data to the CPMM. The CPMM applies a set of rules to the power consumption data to determine when and at which computers to enable and disable a CPU power throttling mode.

Another embodiment of the invention pertains to a server-side apparatus for a rack-mounted computer. Local monitoring circuitry at the computer is coupled to a central processing unit (CPU) of the computer and coupled to a centralized power management system. The local circuitry is configured to monitor power consumption at the CPU, transmit power consumption data to the centralized power management system, receive management messages from the centralized power management system, and send commands to enable and disable a power throttling mode at the CPU.

Another embodiment of the invention pertains to a central power management apparatus for a group of computers mounted in a rack. A management module is coupled to local monitoring circuitry at each computer in the group. The management module is configured to receive power consumption data from the local monitoring circuitry, determine at which computers to enable and disable a CPU power throttling mode, and transmit messages to said determined computers to enable and disable the CPU power throttling mode.

Another embodiment of the invention pertains to a method for power management of a group of computers. Power consumption at each computer in the group is monitored. The resultant power consumption data is transmitted from each computer in the group to a centralized power manager.

Another embodiment of the invention pertains to a centralized method for managing power consumption of a group of computers. Power consumption data is received from the local monitoring circuitry. A determination is made as to at which computers to enable and disable a CPU power-throttling mode. Messages are transmitted to said determined computers to enable and disable the CPU power throttling mode.

Another embodiment of the invention pertains to a power management apparatus for managing power usage of a group of computers at a rack-level. The apparatus includes at least means for receiving power consumption data from the local monitoring circuitry, means for determining at which computers to enable and disable a CPU power throttling mode, and means for transmitting messages to said determined computers to enable and disable the CPU power throttling mode.

DETAILED DESCRIPTION

As discussed above, server racks and similar systems require substantial power to operate, and continuous operation of the servers is of critical importance in data centers, compute farms, and other applications. Recently, high-density computing systems, for example implemented using blade servers, are becoming more prevalent. Applicants have found that such high-density computing racks may have power requirements beyond what the older infrastructure of the data centers was designed to accommodate.

To overcome this problem, a policing mechanism may be used to enable using these new higher-wattage servers in existing data centers or compute farms. One embodiment of the present invention targets for policing the parts of the system with the highest power consumption, those parts being the central processing units (CPUs) of the servers. Another embodiment employs a CPMM to track power utilization over time, and uses this information in conjunction with other parameters (for example, CPU temperature) for policing power utilization.

Monitoring and throttling power consumption at the CPU level is advantageous over previous solutions, which involved application level monitoring and throttling. This is because application monitoring and throttling requires significant changes and adjustments be made to the application and/or operating system code. Instead, monitoring and throttling power consumed by CPUs is transparent to the applications running on the computer and does not require such code modification.

Figure 1:
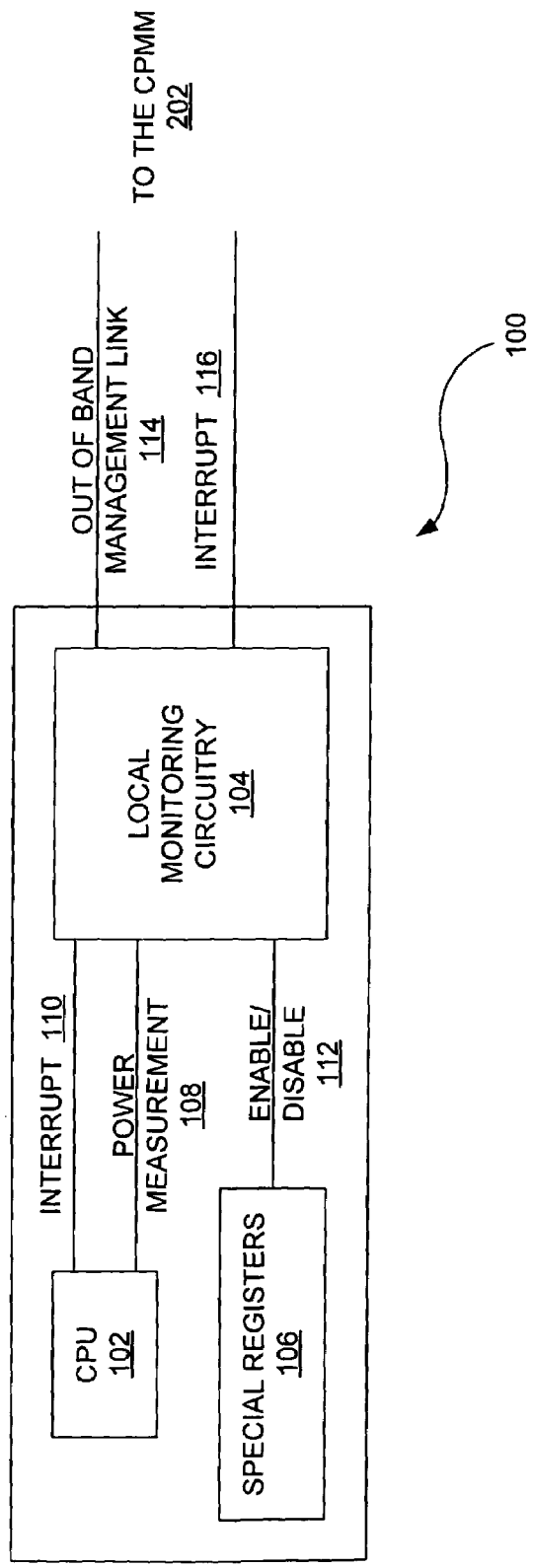
FIG. 1 is a schematic diagram depicting server side infrastructure circuitry in accordance with an embodiment of the invention.

FIG. 1 is a schematic diagram depicting server side infrastructure (SSI) circuitry 100 in accordance with an embodiment of the invention. The SSI circuitry 100 at one server or computing device is shown. Each server or computing device on a rack or blade chassis may be configured to include such SSI circuitry 100.

The SSI circuitry 100 operates to monitor and throttle the power consumption of a CPU 102 of the server or computing device. One component of the SSI circuitry 100 is the local monitoring circuitry 104. The local monitoring circuitry 104 may be implemented using a microcontroller and other circuitry.

The local monitoring circuitry 104 is coupled to the CPU 102 by way of a power measurement link 108 and an interrupt link 110. By way of the measurement link 108, data indicating the power being consumed by the CPU 102 is received by the local monitoring circuitry 104. The interrupt link 110 may be used to transmit interrupt messages to the CPU 102. For example, one interrupt message may be sent that activates an interrupt handler to make a system call to enable or "turn on" power throttling mode at that CPU 102. Another interrupt message may be sent that activates an interrupt handler to make a system call to disable or "turn off" power throttling mode at that CPU 102. Alternatively or in addition to the interrupts, one or more special register 106 may be used to turn on and off the power-throttling mode. The special register 106 may be configured so as to be readable by the CPU 102 and writable by the local circuitry 104. For example, setting a special register 106 may enable the power throttling mode, while clearing the register 106 may disable the power throttling mode. The register(s) 106 may be integrated with the CPU 102, or alternatively, may be located external to the CPU 102.

The local monitoring circuitry 104 is also coupled to the central power management module (CPMM) 202. A management link 114 between the CPMM 202 and the local monitoring circuitry 104 may be used to receive a polling message from the CPMM 202. When polled, the local monitoring circuitry 104 may respond by transmitting via the management link 114 a root mean squared or other derived power consumption value to the CPMM 202. In one embodiment, the management link 114 may comprise an out-of-band (OOB) link, such as an I2C (Inter IC) based bus. Preferably, the management link 114 is implemented to provide a relatively fast link that can be scaled either through the use of multiplexer or hubs. Other possible implementations of the management link 114 may employ a serial bus, a USB (Universal Serial Bus) connection, a LAN network, or other type of link. In addition, the local circuitry 104 may notify the CPMM 202 of any failure or otherwise notable events through an interrupt message. The interrupt message may be transmitted via a separate interrupt line 116, or alternatively, may be sent along the management link 114.

Figure 2:
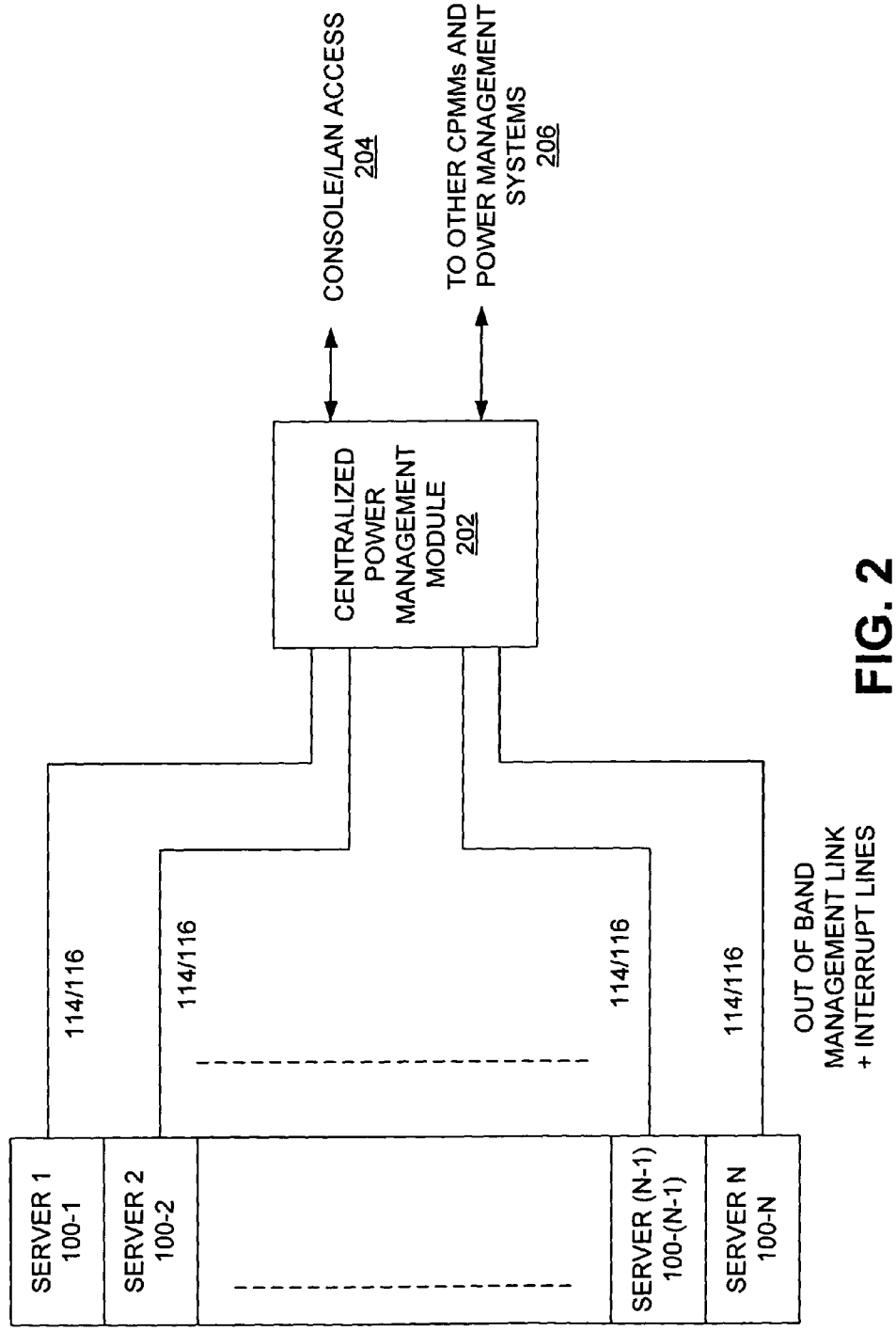
FIG. 2 is a schematic diagram depicting a centralized power management module coupled to multiple servers in accordance with an embodiment of the invention.

FIG. 2 is a schematic diagram depicting a centralized power management module (CPMM) 202 coupled to SSI circuitry 100 at multiple servers or computing devices in accordance with an embodiment of the invention. As illustrated, there may be N servers, each with SSI circuitry 100, coupled to a single CPMM 202. The coupling between the CPMM 202 and each instance of SSI circuitry 100 may be implemented by way of a management link 114 and an interrupt line 116.

The CPMM 202 may be implemented using a management processor, a scalable management link to connect to the individual SSI circuitry 100, and a link 204 to a control console or access to a local area network (LAN) 204. Another communication link 206 may be used to connect an individual CPMM 202 to other CPMMs 202 and/or to power management systems.

The CPMM 202 may be used to monitor the power being consumed by the CPUs 102. The monitoring may be done by polling. In addition, local circuitry 104 at the server or computing device may notify the CPMM 202 of failure events or other power related events by way of the interrupt line 116. If the set of servers or other computing devices being monitored is consuming power within the applicable limit, and no other power related condition exists, then the CPMM 202 may continue polling.

On the other hand, if the set of servers or other computing devices is consuming power beyond the applicable limit, or another power related condition exists, then the CPMM 202 may apply a configurable set of rules to cause certain servers to operate in CPU throttling mode to mitigate the over-consumption or other power related condition. CPU throttling mode refers to a mode in which a CPU is operating in a lower power consumption state with either lesser performance, limited functionality, or both. The request to enable the CPU throttling mode may be sent over the OOB management link 114. In accordance with one embodiment, one or more computers may be set at a higher priority level such that the CPUs 102 of other computers in the system have their power throttled before the higher priority computers. Similarly, a same or different set of rules may be used to evaluate when and which servers or other computing devices to be taken out of the CPU throttling mode (and back to the normal operating mode). In accordance with one embodiment, there may be a certain level of hysteresis between the rules to enter and exit CPU throttling mode. For example, the power consumption level which induces throttling may be higher than the power consumption level at which throttling is removed. Such hysteresis would prevent instances of rapid switching back and forth between CPU throttling and normal modes in borderline circumstances. In one embodiment, the CPMM 202 may be configured so that a user can interact with it by way of a console and a local or networked console link 204. Through such a local or remote console, a user may be enabled to setup or customize the aforementioned rules, obtain power consumption status or logs, and so on.

The CPMM 202 may also be configured to communicate with other CPMMs 202, or power management systems, or other management systems, by way of another link 206. The other link 206 may be implemented, for example, as a LAN connection. For example, each CPMM 202 may collect power consumption data or other information and forward the information to a power management system or to a system administrator. The power management system may be configured for a user to view power consumption data, to modify or override the power throttling rules, and so on. In the case of failure of a server or computing device, the associated CPMM 202 may receive notification via an interrupt and may forward the notification upstream to a system administrator (for example, by way of a pager or email).

In accordance with an embodiment of the invention, instead of all servers or computing devices on a rack including the SSI circuitry 100 for power management, a subset of the servers or computing devices on a rack may include the SSI circuitry 100 and be coupled to a CPMM 202. This enables power management of that subset of devices, particularly if that subset has a separate power supply system.

In other embodiments, a different grouping of systems, such as the computers in a cluster or in a data center or in an office, may each include SSI circuitry 100 and be controlled by a CPMM 202. Such a grouping of systems may include, for instance, computers on more than one rack or blade chassis, or a group of workstations in an office. In such embodiments, power load balancing may be implemented, for example, to prevent hot spots of power utilization.

In accordance with another embodiment, the above design and architecture may be applied to a cooling (instead of power) infrastructure. For example, instead of monitoring power consumption, the local monitoring circuitry 104 may be applied to monitor temperatures at the various computers. If a temperature exceeds an allowed level for a computer, the power-throttling mode may be activated for that computer in order to counteract the elevated temperature. Alternatively, or in addition, additional cooling via a fan or thermoelectric cooler may be applied in response to the elevated temperature.

In accordance with another embodiment, each computer in a group may include more than one CPU. Power consumption at each of the CPUs may be monitored and a power-throttling mode may be applied per CPU in each computer. In other words, the present invention is not limited to computers or servers with one CPU each.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A system for power management of a rack of computers, the system comprising:
   server side infrastructure (SSI) circuitry at each computer in the rack, the SSI circuitry including local monitoring circuitry coupled to a central processing unit (CPU) of the computer; and
   a centralized power management module (CPMM) with an out-of-band (OOB) management link to the SSI circuitry at each computer in the rack,
   wherein the CPMM is configured to monitor power being consumed by the CPUs by sending a polling message to the SSI circuitry at each computer in the rack,
   wherein the local monitoring circuitry within the SSI circuitry at each computer in the rack is configured to monitor power consumption and temperature at the CPU and to respond to the polling message from the CPMM by transmitting a power consumption value and a temperature consumption value to the CPMM, and
   wherein the CPMM is further configured to apply a set of rules to the power consumption and temperature values from the local monitoring circuitry to determine when and at which computers to enable and disable a CPU power throttling mode and when at which CPUs to apply thermoelectric cooling.

2. The system of claim 1, wherein the rack of computers comprises servers mounted in the rack.

3. The system of claim 1, wherein the rack of computers comprise a plurality of blade servers in a blade chassis.

4. The system of claim 1, further comprising:
   a console coupled to the CPMM for user interaction.

5. The system of claim 4, wherein the console comprises a console connected locally to the CPMM.

6. The system of claim 4, wherein the console comprises a remote console coupled via a network to the CPMM.

7. The system of claim 4, wherein the system is configured to enable a user to setup the aforementioned rules by way of the console.

8. The system of claim 4, wherein the system is configured to enable a user to view power consumption data by way of the console.

9. The system of claim 1, further comprising:
   additional CPMMs with management links to SSI circuitry at additional racks of computers; and
   a power management system coupled to the plurality of CPMMs.

10. The system of claim 9, wherein the power management system is configured to enable a user to view power consumption data and to customize the sets of rules applied by the CPMMs.

11. A server-side apparatus for a rack-mounted computer, the apparatus comprising:
    local monitoring circuitry coupled to a central processing unit (CPU) of the computer and coupled to a centralized power management system which is configured to manage power and temperature for a rack of computers,
    wherein the local circuitry is configured to monitor power consumption and temperature at the CPU, transmit power consumption and temperature data to the centralized power management system, receive out-of-band polling messages from the centralized power management system, respond to the polling messages by transmitting a power consumption value and a temperature value to the centralized power management system, and send commands to enable and disable a power throttling mode and to apply thermoelectric cooling at the CPU.

12. The apparatus of claim 11, further comprising:
    a power measurement link between the local monitoring circuitry and the CPU for monitoring power consumption at the CPU.

13. The apparatus of claim 12, further comprising:
    an interrupt line between the local monitoring circuitry and the CPU for transmitting interrupt messages that enable and disable the power throttling mode at the CPU.

14. The apparatus of claim 12, further comprising:
    a special register writable by the local monitoring circuitry and readable by the CPU to enable and disable the power throttling mode at the CPU.

15. A central power management apparatus for a rack of computers, the apparatus comprising:
    a management module coupled via an out-of-band link to local monitoring circuitry at each computer in the link,
    wherein the management module is configured to transmit polling messages to the local monitoring circuitry, receive temperature values from the local monitoring circuitry in response to the polling messages, determine at which computers to enable and disable a CPU power throttling mode and at which computers to apply thermoelectric cooling, and transmit messages to said determined computers to enable and disable the CPU power throttling mode and messages to said computers to apply the thermoelectric cooling.

16. A power management apparatus for managing power usage of a rack of computers, the apparatus comprising:
    means for transmitting polling messages to local monitoring circuitry;

means for receiving responses to the polling messages from the local monitoring circuitry at each of the computers in the rack, wherein the responses include root mean squared power consumption values and temperature values;

means for determining at which computers to enable and disable a CPU power throttling mode and for determining at which computers to apply thermoelectric cooling; and means for transmitting messages to said determined computers to enable and disable the CPU power throttling mode and to apply said thermoelectric cooling.

17. The apparatus of claim 16, wherein the means for transmitting messages comprise out-of-band links to the local monitoring circuitry.

* * * * *